(12) United States Patent
Wu et al.

(10) Patent No.: US 11,423,063 B2
(45) Date of Patent: Aug. 23, 2022

(54) FLATTENING HIERARCHICAL DATABASE RECORDS USING INVERTED INDEXING

(71) Applicant: salesforce.com, inc., San Francisco, CA (US)

(72) Inventors: Yu Wu, San Francisco, CA (US); Guillaume Le Stum, San Francisco, CA (US); Srikara Rao, San Francisco, CA (US)

(73) Assignee: SALESFORCE, INC., San Fancisco, CA (US)

( * ) Notice: Subject to any disclaimer, the term of this patent is extended or adjusted under 35 U.S.C. 154(b) by 813 days.

(21) Appl. No.: 16/051,255

(22) Filed: Jul. 31, 2018

(65) Prior Publication Data

US 2020/0042637 A1 Feb. 6, 2020

(51) Int. Cl.
*G06F 16/31* (2019.01)
*G06F 16/185* (2019.01)
*G06F 16/901* (2019.01)
*G06F 16/28* (2019.01)

(52) U.S. Cl.
CPC .......... *G06F 16/319* (2019.01); *G06F 16/185* (2019.01); *G06F 16/322* (2019.01); *G06F 16/9027* (2019.01)

(58) Field of Classification Search
CPC .... G06F 16/319; G06F 16/185; G06F 16/322; G06F 16/9027; G06F 16/282; G06F 16/22; G06F 16/31; G06F 16/901; G06F 16/28
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |

(Continued)

*Primary Examiner* — Tarek Chbouki
*Assistant Examiner* — Maher N Algibhah
(74) *Attorney, Agent, or Firm* — Schwabe Williamson & Wyatt

(57) ABSTRACT

Embodiments of the present disclosure relate to flattening hierarchal database records using inverted indexing. Other embodiments may be described and/or claimed.

18 Claims, 4 Drawing Sheets

(56) References Cited

U.S. PATENT DOCUMENTS

| | | |
|---|---|---|
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,502,101 B1 * | 12/2002 | Verprauskus ....... G06F 16/9027 |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,429,179 B1 * | 4/2013 | Mirhaji ............... G06N 5/02 |
| | | 707/756 |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,595,181 B2 | 11/2013 | Le Stum |
| 8,646,103 B2 | 2/2014 | Jakobson et al. |
| 8,972,421 B2 | 3/2015 | Vishnubhatta |
| 9,613,326 B2 | 4/2017 | Vishnubhatta |
| 9,619,530 B2 | 4/2017 | Schneider |
| 10,721,323 B2 | 7/2020 | White |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0066033 A1 * | 4/2003 | Direen, Jr. ............. G06F 16/30 |
| | | 715/255 |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Dice et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0165838 A1 * | 7/2005 | Fontoura ............... G06F 16/951 |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky |

(56) References Cited

U.S. PATENT DOCUMENTS

| | | |
|---|---|---|
| 2011/0247051 A1 | 10/2011 | Bulumulla |
| 2012/0042218 A1 | 2/2012 | Cinarkaya |
| 2012/0233137 A1 | 9/2012 | Jakobson et al. |
| 2012/0290407 A1 | 11/2012 | Hubbard et al. |
| 2013/0132870 A1 | 5/2013 | Vishnubhatta |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0246341 A1 | 9/2013 | Tobin |
| 2013/0247216 A1 | 9/2013 | Cinarkaya |
| 2014/0067775 A1 | 3/2014 | Le Stum |
| 2014/0129530 A1* | 5/2014 | Raufman ............... G06F 7/78 707/693 |
| 2014/0324882 A1* | 10/2014 | Giovanni ........... G06F 16/2246 707/742 |
| 2014/0359537 A1 | 12/2014 | Jackobson et al. |
| 2015/0142807 A1* | 5/2015 | Hofmann ............... G06N 3/02 707/737 |
| 2016/0275100 A1* | 9/2016 | Nash .................. G06F 16/185 |
| 2017/0091305 A1* | 3/2017 | Cao ................... G06F 16/285 |
| 2017/0262517 A1* | 9/2017 | Horowitz ........... G06F 16/2471 |
| 2019/0065545 A1* | 2/2019 | Hazel ................ G06F 16/211 |
| 2019/0310869 A1* | 10/2019 | Lin .................. G06F 16/2272 |
| 2019/0384765 A1 | 12/2019 | White |
| 2020/0019630 A1 | 1/2020 | Wu |
| 2020/0042637 A1 | 2/2020 | Wu |

\* cited by examiner

| | A | B | C | D | E |
|---|---|---|---|---|---|
| 1 | Child | (ValueId) | Parent | (ValueId) | Desired pathField output |
| 2 | Dave | 4 | Ally | 0 | Ally/Mona |
| 3 | Andy | 1 | Cari | 1 | Cari/Dave/Ally/Mona |
| 4 | Bill | 2 | Cari | 1 | Cari/Dave/Ally/Mona |
| 5 | Seth | 6 | Mark | 3 | Mark/Ally/Mona |
| 6 | Mark | 5 | Ally | 0 | Ally/Mona |
| 7 | Andy | 1 | Cari | 1 | Cari/Dave/Ally/Mona |
| 8 | Cari | 3 | Dave | 2 | Dave/Ally/Mona |
| 9 | Bill | 2 | Cari | 1 | Cari/Dave/Ally/Mona |
| 10 | Ally | 0 | Mona | 4 | Mona |

FLATTENING HIERARCHICAL DATABASE RECORDS USING INVERTED INDEXING

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

Embodiments of the present disclosure relate to flattening hierarchical database records using inverted indexing. Other embodiments may be described and/or claimed.

BACKGROUND

Database systems provide a variety of different operations (also known as "transformations") for processing datasets. One such operation is known as a "flatten" operation, which takes a hierarchical dataset (e.g., data elements or "nodes" in a "tree" structure with the parent and child relationships of the tree described across multiple data elements) and creates a single record for each respective node that describes the hierarchical information associated with the respective node.

Conventional database systems, however, typically store hierarchical datasets using pointers from parent nodes to their respective childe node(s) to allow traversal of the tree and often require large amounts of random-access memory (RAM) to perform flatten operations, particularly for large datasets. Embodiments of the present disclosure address these and other issues.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

Examples of systems, apparatuses, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Some implementations described and referenced herein are directed to systems, apparatus, computer-implemented methods and computer-readable storage media for flattening hierarchical datasets using inverted indexing.

I. System Examples

Figure 1A:
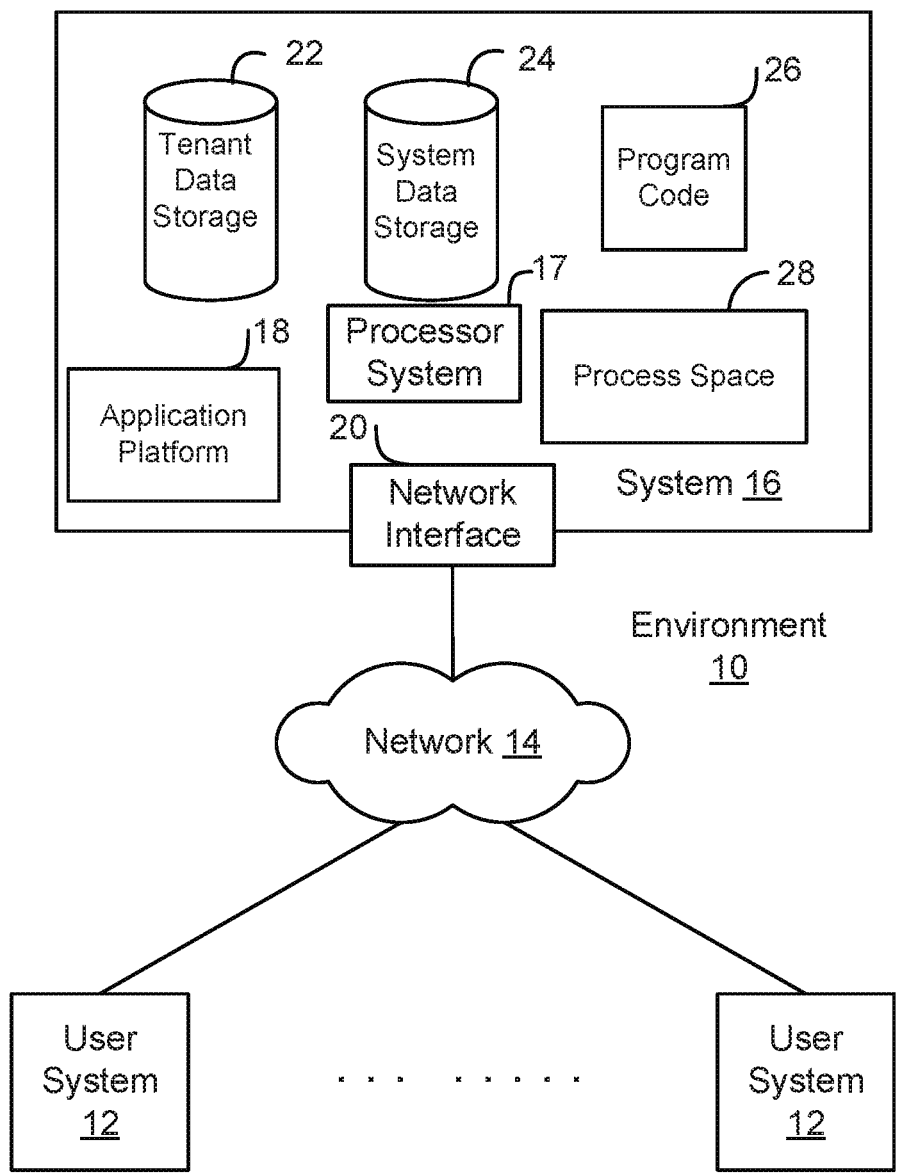
FIG. 1A is a block diagram illustrating an example of an environment in which an on-demand database service can be used according to various embodiments of the present disclosure.

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Apple's Safari, Google's Chrome, Opera's browser, or Mozilla's Firefox browser, or the like, allowing a user (for example, a subscriber of on-demand services provided by the system 16) of the user system 12 to access, process and view information, pages and applications available to it from the system 16 over the network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 1B:
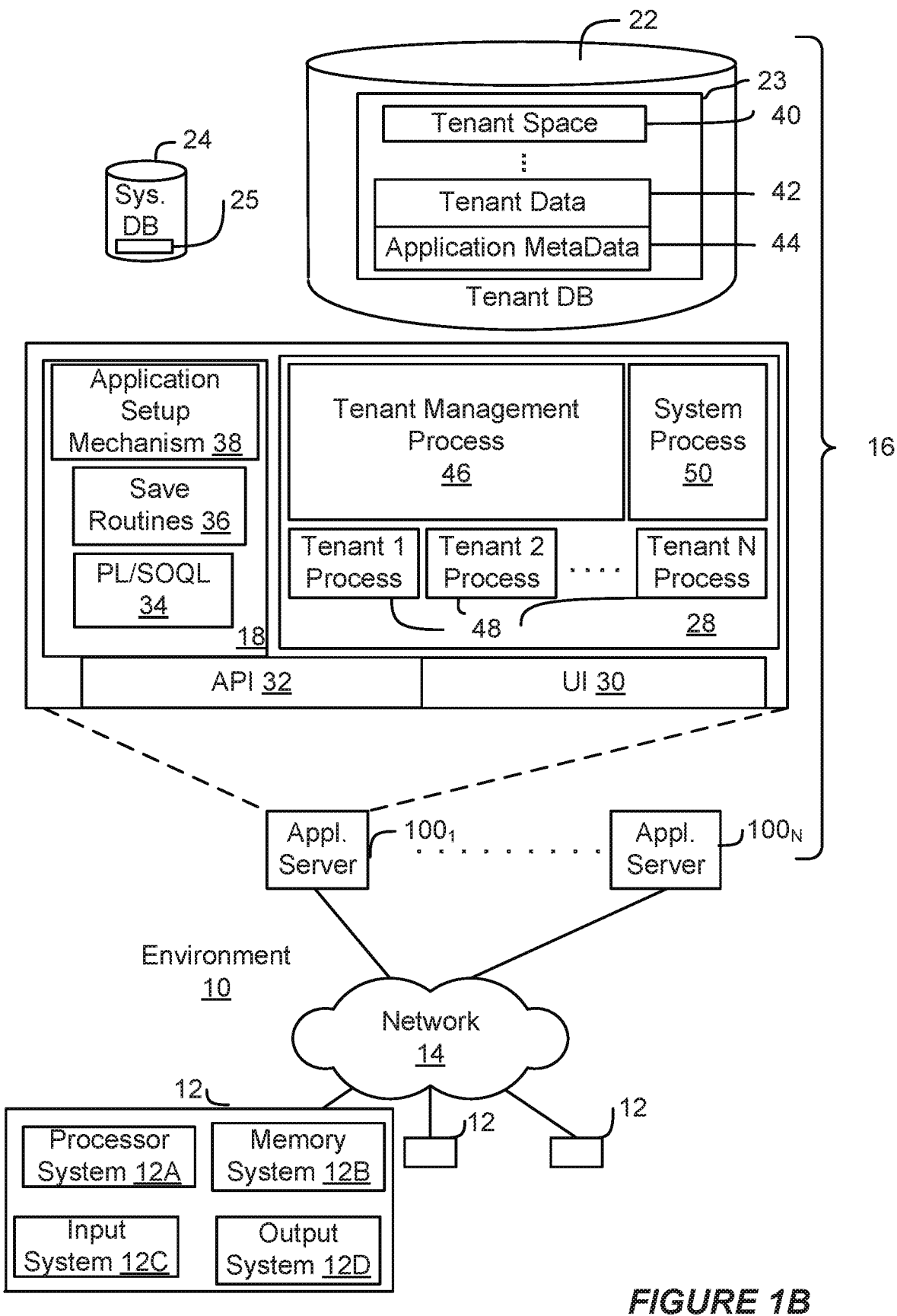
FIG. 1B is a block diagram illustrating examples of implementations of elements of FIG. 1A and examples of interconnections between these elements according to various embodiments of the present disclosure.

FIG. 1B shows a block diagram with examples of implementations of elements of FIG. 1A and examples of interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, the network interface 20 is implemented as a set of HTTP application servers $100_1$-$100_N$. Each application server 100, also referred to herein as an "app server", is configured to communicate with tenant database 22 and the tenant data 23 therein, as well as system database 24 and the system data 25 therein, to serve requests received from the user systems 12. The tenant data 23 can be divided into individual tenant storage spaces 40, which can be physically or logically arranged or divided. Within each tenant storage space 40, user storage 42 and application metadata 44 can similarly be allocated for each user. For example, a copy of a user's most recently used (MRU) items can be stored to user storage 42. Similarly, a copy of MRU items for an entire organization that is a tenant can be stored to tenant storage space 40.

The process space 28 includes system process space 102, individual tenant process spaces 48 and a tenant management process space 46. The application platform 18 includes an application setup mechanism 38 that supports application developers' creation and management of applications. Such applications and others can be saved as metadata into tenant database 22 by save routines 36 for execution by subscribers as one or more tenant process spaces 48 managed by tenant management process 46, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATA- BASE SERVICE, by Craig Weissman, issued on Jun. 1, 2010, and hereby incorporated by reference in its entirety and for all purposes. Invocations to applications can be detected by one or more system processes, which manage retrieving application metadata 44 for the subscriber making the invocation and executing the metadata as an application in a virtual machine.

The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection. For example, one application server $100_1$ can be coupled via the network 14 (for example, the Internet), another application server $100_{N-1}$ can be coupled via a direct network link, and another application server $100_N$ can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example of a storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of an MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

II. Flattening Hierarchical Datasets Using Inverted Indexing

Figures 2A, 2B:
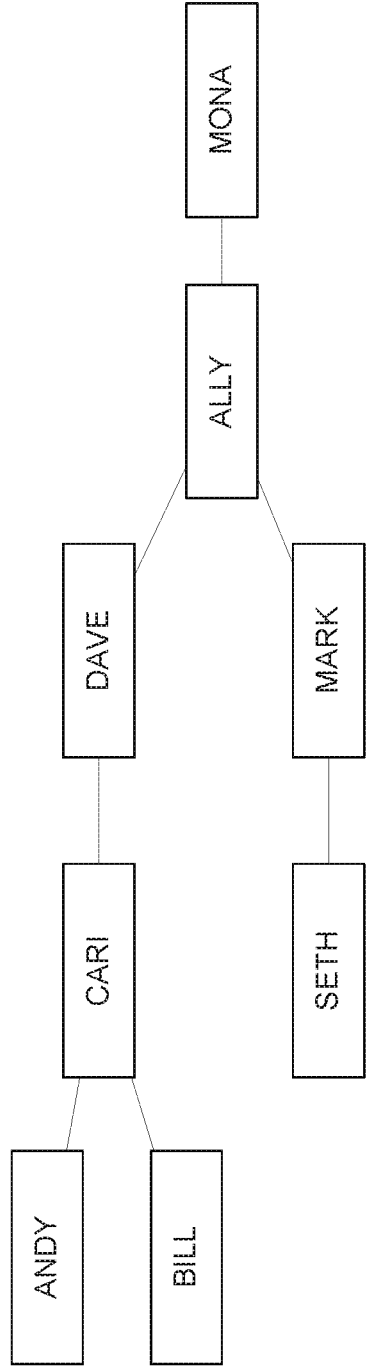
FIG. 2A is an example of a hierarchical dataset in tabular format according to various embodiments of the present disclosure.
FIG. 2B illustrates a tree diagram of the hierarchical dataset in FIG. 2A according to various aspects of the present disclosure.

A hierarchical dataset is a dataset where records in the dataset are stored in a "tree" structure having parent-child relationships between the records. Among other things, hierarchical datasets may be used to express a "one-to-many" relationships between records. An example of a hierarchical dataset is shown in FIG. 2A, with a corresponding tree diagram for the dataset in Figure A illustrated in FIG. 2B. In this example, the node "Mona" is at the "root" of the tree, with the node "Ally" having a child relationship to Mona. The nodes "Dave" and "Mark" are children of Ally, and so forth. Note that the "Desired pathField output" column is presented for illustration purposes, but is not part of the dataset.

In hierarchical datasets, the "child cardinality" of the dataset refers to the number of child nodes and the "parent cardinality" refers to the number of parent nodes. The connection between one node to another (i.e., denoting the parent-child relationship between the nodes) is known as an "edge," while the "depth" of a respective node in the tree refers to the number of edges from the tree's root node to the respective node. In the example shown in FIGS. 2A and 2B, Ally's depth is one, while Andy's depth is four.

An inverted index (also referred to as a "postings file" or "inverted file") is an index data structure storing a mapping from content in a dataset, such as words (e.g., in the form of a text string), numbers (e.g., a numeric value) or combinations thereof (e.g., an alphanumeric string) to the respective locations of the content in a database file.

As described in more detail below, embodiments of the present disclosure may use inverted index data structures to map dimension string values (such as parent and child dimensions) to integers, such that the integers may be used to represent both numeric content and string content. Database systems implementing embodiments of the present disclosure may thus process relatively shorter lists of integers representing much longer strings, thereby allowing the database system to perform a relatively faster and less-memory-intensive processing of datasets compared to conventional systems. Embodiments of the present disclosure may provide a flatten transformation that takes the child fields and parent fields from records in a hierarchical dataset as input and creates a flattened dataset.

The flattened dataset may contain any suitable data structures in any suitable format. For example, the flattened dataset may contain records having a multi-value field (mvField) and path field (pathField) that contain information on the hierarchy of the hierarchical dataset. In this example, given the child & parent information, the system creates the mvField and pathField to show which nodes have access to each row. Among other things, this allows the system, when querying the dataset given a user's credential, to filter rows that are only accessible to the user, then do other calculations on the filtered rows so that each user can only see information available for that role.

The mvFields and pathFields may be generated in a variety of formats. For example, the mvField may provide a comma-separated list of all ancestors for a given node in the hierarchy, while the pathField provides the hierarchy path with a "|" between nodes in the path. In a particular example of this format, consider a hierarchical dataset where an "Andrew" record is the root node and parent to a "Mark" node, and Mark is a parent to a "Seth" node. For the Mark node, the mvField would include: "Mark, Andrew" and the pathField would include "Mark/Andrew." For the Seth node, the mvField would be "Seth, Mark, Andrew" and the pathField would be "Seth/Mark/Andrew."

Embodiments of the present disclosure help provide efficient process for performing the flatten operation on a dataset by, among other things, using an inverted index to map dimension values (e.g., string values) to integer values (e.g, using the dimension value identifier) and co-iterating role id and parent role id dimensions to build hierarchy trees. Embodiments of the present disclosure provide a succinct encoding technique to store trees in a manner that helps to minimize the use of memory on the database system. In particular, and as described in more detail below, instead of storing nodes and pointers of a parent node to a child node (which is the most common manner hierarchical datasets are implemented by conventional database systems), embodiments of the present disclosure utilize two arrays of integer values. The first array stores dimension value identifiers for each parent node consecutively, while the second array stores the number of children each parent node has. Accordingly, the system may utilize these two arrays, without pointers, to perform a depth-first traversal to build hierarchy trees.

As shown in the dataset example depicted in FIG. 2A, the "Child" and "Parent" fields in the dataset are string values (i.e., "Dave," "Ally," etc.). Furthermore, Child and Parent are separate dimensions, so their value sets are not necessarily the same and a value can have different Parent Child identifiers. For the purpose of performing the flatten operation by embodiments of the present disclosure, the strings in the Child and Parent fields may be represented by their respective valueIds (which are zero based sequential integers in this example) and the Parent and Child value identifiers mapped.

When Child values are included, the system may build a temporary merged dimension for the purpose of manipulating Child and Parent as common identifiers. For example, hierarchy leaf values can be in the Child field but not in the Parent field, and root values can be in the Parent field without being in the Child field. In some embodiments, the temporary merged dimension can be generated by co-iterating Child and Parent inverted indexes and comparing the string values.

By contrast, in cases where a flatten operation doesn't include Child values, the system can use the Parent dimension as a reference for value identifiers. For the sake of explanation, the description below proceeds by assuming the simpler case where Child values are not included and Parent is the reference dimension.

As noted previously, embodiments of the present disclosure may implement value identifier-to-value identifier maps (e.g. ChildId→ParentId) in memory using arrays ([ ]int), thereby significantly reducing the required memory (e.g., RAM) to perform the flatten operation. In some embodiments, value ids may be represented as contiguous sequential integers starting from zero, and a key is used as an index in the array to get the value.

A null value (represented as value id −1 in dimension indexes) may be mapped using (max(value id)+1) as a key instead of −1 (i.e. cardinality(Parent)). A particular example of this is shown between the lists "L" (in FIG. 3D) and "LV" (in FIG. 3E) and described in more detail below.

In some embodiments, the system may enforce a maximum supported Child cardinality to allow the flatten operation to be performed within a known maximum amount of memory. For example, if the maximum Child cardinality is 100M, the corresponding array value id map is 100M×4→400 MB (value ids are int32).

Additionally or alternatively, the system may implement mappings of portions of the dataset sorted by key id and use sort-merge join operations to fit the portions in available memory. In this context, a "sort-merge join" operation refers to an operation that combines two sorted lists.

For example, the system may partition the child-parent relationship according to parent depth, to allow depth first traversal with sort-merge joins. Each level of the tree/hierarchy may be stored in RAM (available) and alternatively spilled over to secondary storage (e.g., hard disk) and subsequently retrieved from secondary storage via sort-merge join operations.

After building the tree, either using the succinct encoding technique to minimize memory usage or using the spill-over technique that retrieves information from secondary storage (both described in detail below), a depth first traversal of the tree is performed to create the multi-value fields and path dimension fields with the hierarchy information described above.

As with the flattened dataset, embodiments of the present disclosure may be implemented in conjunction with input datasets in a variety of formats. The dataset shown in FIG. 2A, for example, illustrates an example of a dataset in tabular format. In this example, dataset 200 includes columns labeling different data fields, with each row representing a separate data element.

The dataset 200 in FIG. 2A may also be represented in the form of a data structure, such as an "edgemart" data structure provided by salesforce.com, inc, of San Francisco, Calif. For example, dataset 200 may be represented as an inverted index edgemart data structure with dimensions for child nodes and parent nodes. In a hierarchical dataset, "transitive closure" refers to determining whether a path or relationship exists between one node in the dataset and another node. In some embodiments, the system may analyze a dataset represented, for example, by an edgemart with child and parent dimensions, and calculate the transitive closure as a multi value dimension where each value is associated with the ordered list of rows (also known as a "recordset") the value is an ancestor of, and a path dimension containing the concatenated parents in order starting from the root.

Determining transitive closure in a hierarchical dataset presents a number of differences and challenges compared to general transitive closure determinations for other types of graphs. In particular, a child in a hierarchical dataset has at most one direct parent. Additionally, if "n" is the child dimension cardinality: the initial tree has only (n-1) edges (i.e., a sparse graph) though the transitive closure worst case (child1.fwdarw.child2.fwdarw fwdarw.childn) has (n-1)*n/2 edges, resulting in a complexity of O(n{circumflex over ( )}2).

Furthermore, determining the pathField for each node in a hierarchical dataset is more complicated than just determining its transitive closure, as determining the path not only requires knowing the un-ordered set of parents for a given child, but also the order and distance of each parent. For each node in a hierarchical dataset, embodiments of the present disclosure may look up the dimension value and recordset in the inverted index and calculate the union of all recordsets from the sub-tree.

Dimension lookups and recordset operations are typically computationally expensive. Embodiments of the present disclosure may utilize a depth first traversal of the tree (rather than materializing the transitive closure) such that the number of lookups and recordset operations are minimized (e.g. to once per node), thus improving the efficiency of the flatten operation compared to conventional database systems.

Figure 3:
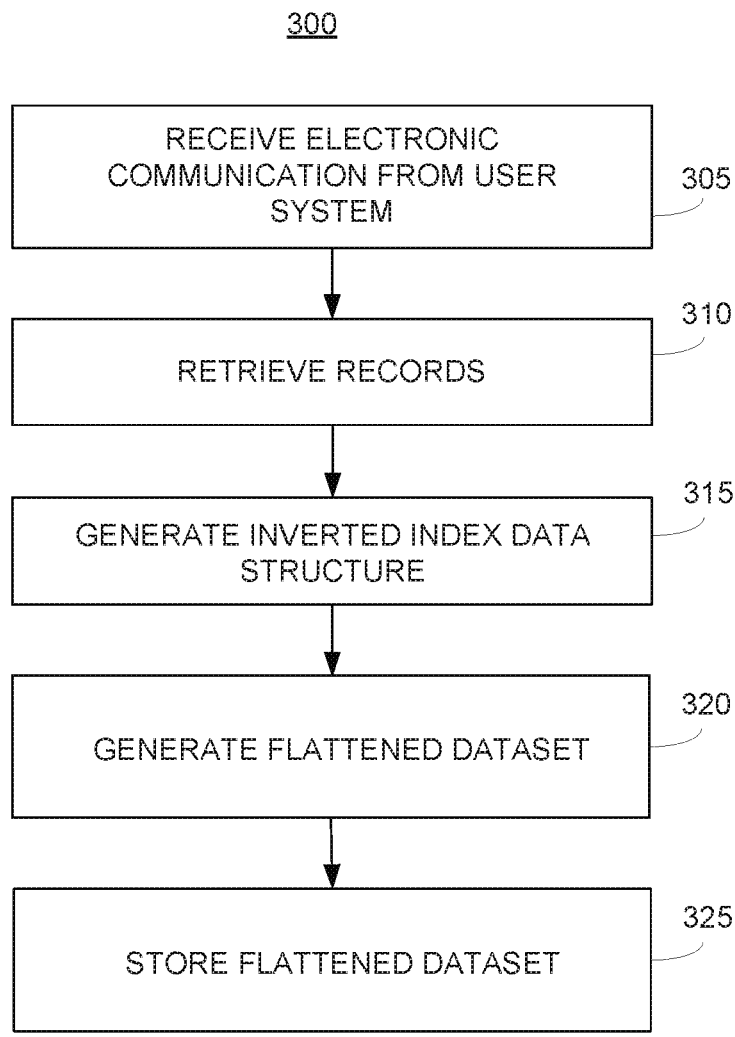
FIG. 3 is a flow diagram illustrating an example of a process according to various embodiments of the present disclosure.

FIG. 3 is a flow diagram illustrating an example of a process 300 according to various aspects of the present disclosure. Any combination and/or subset of the elements of the methods depicted herein (including method 300 in FIG. 3) may be combined with each other, selectively performed or not performed based on various conditions, repeated any desired number of times, and practiced in any suitable order and in conjunction with any suitable system, device, and/or process. The methods described and depicted herein can be implemented in any suitable manner, such as through software operating on one or more computer systems. The software may comprise computer-readable instructions stored in a tangible computer-readable medium (such as the memory of a computer system) and can be executed by one or more processors to perform the methods of various embodiments.

In this example, process 300 includes receiving, from a user system in communication with the database system, an electronic communication identifying one or more datasets to perform a flattening operation on, one or more key values, or other information and/or instructions (305); retrieving records from one or more datasets electronically stored by the database system in one or more database files (310); generating, based on the streamed records, an inverted index data structure that maps respective content within the records to respective locations in the one or more database files (315); generating, using the inverted data structure, a flattened dataset corresponding to the hierarchical dataset (320); and storing the flattened dataset (325).

As described above, a database system (e.g., implemented by system 16 illustrated in FIGS. 1A and 1B) may exchange electronic communications with one or more user systems (e.g., user system 12 illustrated in FIGS. 1A and 1B), such as over a network (e.g., network 14 in FIGS. 1A and 1B). In method 300, database system 16 may receive an electronic communication (305) over network 14 from a user system 12 to identify one or more hierarchical datasets to flatten, as well as other information such as a key value (e.g., for sorting data), settings, preferences, search terms, and/or other instructions.

Embodiments of the present disclosure may retrieve (310) records from a hierarchical dataset and generate (315) an inverted index data structure that maps content within the hierarchical dataset to the respective locations of the content in the dataset. The content mapped by the inverted index data structure, including the Parent and Child dimensions noted previously, may be in any suitable format, including text strings, alphanumeric strings, numeric values, or combinations thereof. In some embodiments, the locations to which content are mapped by the inverted index data structure correspond to integer values, and generating the inverted index data structure includes generating one or more arrays of integer values mapping the parent-child relationships in the hierarchical dataset.

The system may generate a child inverted index that maps each respective child node in the hierarchical dataset to a respective location in the hierarchical dataset associated with respective child node, and generate a parent inverted index that maps each respective parent node in the hierarchical dataset to a respective location in the hierarchical dataset associated with the respective parent node.

For example, consider an inverted index Child dimension (denoted by: Child: (key, valueId, rowIds), where "rowId" is the table index −1. Accordingly, the inverted index for Ally would be (0) (9), where the 0 is Ally's ValueId and 9 is the rowId (table index 10−1=9). Similarly, Andy's ValueId is 1 and Andy appears in rows 3 and 7 of the table (rowID's 2 and 6), therefore Andy's inverted index would be (1) (2, 6) using this format. Based on the dataset in FIG. 2A the inverted index for the Child dimension is thus:

Ally(0) (9)
Andy(1) (2, 6)
Bill(2) (3, 8)
Cari(3) (7)
Dave(4) (1)
Mark(5) (5)
Seth(6) (4)

Using the same format, an example of the inverted index Parent dimension is:

Ally(0) (1, 5)
Cari(1) (2, 3, 6, 8)
Dave(2) (7)
Mark(3) (4)
Mona(4) (9)

The database system generates a flattened dataset (320) corresponding to the hierarchical dataset using the inverted index data structure. In some embodiments, generating the flattened dataset includes iterating the child inverted index and the parent inverted index to generate a mapping array data structure that identifies child nodes in the hierarchical dataset that are also parent nodes.

Continuing with the Child and Parent dimension inverted indexes introduced above, for example, the system may iterate the Child and Parent dimension inverted indexes to build a value mapping array with size cardinality(Child) in memory as follows:

0: 0 (Ally)
1: −1 (Andy is not a Parent)
2: −1 (Bill is not a Parent)
3: 1 (Cari)
4: 2 (Dave)
5: 3 (Mark)
6: −1 (Seth is not a Parent)

The child-to-parent mapping array data structure (i.e., an array in this example) would thus be: [0, −1, −1, 1, 2, 3, −1]. Note that this array is a 0-based indexed array, therefore child-to-parent map[0]=0, child-to-parent map[1]=−1, and so forth.

The database system may map child node identifiers to parent node identifiers based on the mapping array data structure. For example, the system may express Child relationships using Parent value identifiers by iterating Child and Parent by row to build a set of sorted integer tuples (represented, for example as: IntTupleSorter Rp=[ ] {ChildId, ParentId}), and the relationships sorted by ParentId, ChildId. The Child dimension index value identifiers are mapped to Parent value identifiers using the child-to-parent mapping array shown above.

Referring again to the dataset table shown in FIG. 2A, generation of the "Rp" tuple set for the first five rows of the table would thus proceed as follows:

Row 1: 4 (Dave) is a child of 0 (Ally); index 4 in the child-to-parent map map[4]=2 thus result for Rp (ChildId, ParentId) is {2, 0};

Row 2: 1 (Andy) is a child of 1 (Cari); index 1 in the child-to-parent map[1]=−1, thus the result will be discarded as Andy is a final child;

Row 3: 2 (Bill) is a child of 1 (Cari); index 2 in the child-to-parent map map[2]=−1, thus the result will be discarded as Bill is a final child;

Row 4: 6 (Seth) is a child of 3 (Mark): index 6 in the child-to-parent map map[6]=−1, thus the result will be discarded as Seth is a final child;

Row 5: 5 (Mark) is a child of 0 (Ally); index 5 in the child-to-parent map map[5]=3 thus result for Rp (ChildId, ParentId) is {3, 0}.

The final result of Rp for all rows in the dataset 200 shown in FIG. 2A is thus:

| Rp: | |
| --- | --- |
| {4, −1} | (Mona is root) |
| {2, 0} | (Dave −> Ally) |
| {3, 0} | (Mark −> Ally) |
| {1, 2} | (Cari −> Dave) |
| {0, 4} | (Ally −> Mona) |

The system may generate, based on the mapping of child node identifiers to parent node identifiers, an adjacency list identifying, for each respective parent node, one or more respective child nodes adjacent to the respective parent node. The system may perform a depth-first traversal of the hierarchical dataset using the adjacency list. In some embodiments, the adjacency list is generated in RAM to allow for faster access and processing. Additionally or alternatively, the adjacency list may be stored in a secondary storage device (such as a hard disk) by the database system.

Continuing the example above, the system may iterate Rp to build an adjacency list "L," where L=[Parent Id] [ ]ChildId:

| L: | |
| --- | --- |
| −1: | {4} |
| 0: | {2, 3} |
| 1: | { } |
| 2: | {1} |
| 3: | { } |
| 4: | {0} |

In some embodiments, determining the adjacency list includes generating an array containing a list of child node identifiers, and generating an array indexed by parent node identifiers associated with the array containing the list of child node identifiers. Using adjacency list L above as an example, the system may generate two arrays of size cardinality (Parent)+1, referred to herein as "'LV'" and "LI."

The array LV stores a list of Child ids contiguously, while the array LI is indexed by ParentId and points into end of list of children in LV. Based on the values in L above, examples of LI and LV are shown as follows:

| LI: | |
| --- | --- |
| 0: | 2 −> LV[0:2] |
| 1: | 2 −> LV[2:2] |
| 2: | 3 −> LV[2:3] |
| 3: | 3 −> LV[3:3] |
| 4: | 4 −> LV[3:4] |
| 5: | 5 −> LV[4:5] |
| LV: | |
| 0: | 2 |
| 1: | 3 |

-continued

| | |
|---|---|
| 2: | 1 |
| 3: | 0 |
| 4: | 4 |

In the example of LV shown above, Mona, previously indexed at "−1" in L above (where −1 is used to represent a null value), is mapped to first unused id=cardinality(Parent)=5.

LI represents the number of child nodes that are also parents for each index in L based on subtracting LI[n−1] from LI[n]. For example, L[0] (Ally) has two children that are also parents (Dave and Mark), so LI[0]=2. L[1] (Cari) doesn't have any children that are also parents (Andy and Bill), so LI[1]=2, and LI[1]−LI[0]=2−2=0. Similarly, L[2] (Dave) has one child that is also a parent (Cari), so LI[2]=3, such that LI[2]−LI[1]=3−2=1.

Embodiments of the present disclosure may perform a depth-first traversal of the hierarchical dataset using, for example, arrays LI and LV described above. Among other things, this helps to minimize recordset operations and dimension lookups, which are typically time-consuming.

In order to help ensure each value and recordset is looked up only once, the system may start the depth first tree traversal from the hierarchy root and maintaining a stack of parent values and recordsets. In some embodiments, path values are created pre-order as they are built from the parent values, and Parents multivalue field values are created post order as they are built from children recordsets. An example of algorithm for performing such a traversal is described as follows:

Initially
  ParentId=−1
  Path=" "
  RecordSet={ }
Recurse (ParentId, Path): RecordSet:
  ParentValue, ParentRecordSet=DimLookup(ParentId)
  ParentPath+="/"+ParentValue
  add (ParentPath, ParentRecordSet) to Path dimension
  for each ChildId
    ChildRecordSet=Recurse(ChildId, Path)
    ParentRecordSet=ParentRecordSet V ChildRecordSet
  add (ParentValue, ParentRecordSet) to Parents Multi-Value dimension
  return ParentRecordSet Using this algorithm, consider the examples of LI and LV shown above: LI [2,2,3,3,4,5]; and LV [2,3,1,0,4]. As the root(Mona) is attached to the end of LV, the algorithm first yields a value of 4: LI[4]=4, and LI[4−1]=3, thus Mona has 4−3=1 child, which is looked up in LV[3:4]=0 (Ally).

For 0 (Ally), LI[0]=2, and LI[0−1]=0 (no previous index exists), thus Ally has 2−0=2 children, and the lookup in LV[0:2]=2&3 (Dave & Mark).

For 2 (Dave), LI[2]=3, and LI[2−1]=2, thus Dave has one child, and the lookup in LV[2:3]=1 (Cari).

For 1 (Cari), LI[I]=2, and LI[0]=2, thus Cari has no children (that are also parents) and the system has therefore reached the end of the path: Cari→Dave→Ally→Mona.

For 3(Mark), LI[3]=3 and LI[2]=3, thus Mark has no children (that are also parents), and therefore the system has reached the end of the path: Mark→Ally→Mona.

In some embodiments, generating the flattened dataset may be performed within a fixed amount of random access memory (RAM). In some cases, data exceeding the fixed amount of RAM may be written to a secondary memory storage device (such as a hard disk) in communication with the database system.

In some embodiments, the system may partition relationships in the hierarchical dataset (e.g., according into sorted sets of tuples) according to parent depth, and spilling over to disk if the amount of data reaches a memory threshold to allow the system to perform a depth first traversal with sort-merge joins recursively. An example of such an algorithm is as follows:

With:
  Rp: all Parent-Child relationships
    from step 3, [ ]{ChildId, ParentId} sorted by ParentId, ChildId
  Up(i): unprocessed Parent-Child relationships
    [ ]{ChildId, ParentId} where parent is at depth higher than i,
    sorted by ParentId, ChildId
  Bc(i):branches starting from root down to depth i, sorted by children
    [ ](d, Parent-d, . . . Parent-0, . . . )
    d is branch depth
    tuple width i+1 (depth and up to i value ids)
    sorted by: Parent-d, . . . . Parent-0
  Bp(i):branches starting from root down to depth i, sorted by parents
    [ ] {d, Parent-0, . . . Parent-d, . . . }
    sorted by: Parent-0, . . . , Parent-i
Initially:
  Bp(0): {0, −1}
  Bc(0): {0, −1}
  Up(0): Rp from step 3. [ ] {ChildId, ParentId} sorted by ParentId, ChildId
While Up(n) is not empty:
  sort-merge join Bc(n) and Up(n) to create Bc(n+1) and Up(n+1)
  Bc(n) and Uc(n) can be discarded/recycled at this stage
  iterate Bc(n+1) to create Bp(n+1)

Using the values in Rp shown above, an example of output from this algorithm for four sorted sets of tuples (equal to the depth of the tree −1) would be:
  depth 1: (4, −1)
  depth 2: (0, 4)
  depth 3: (2, 0), (3, 0)
  depth 4: (1, 2), (6, 3)

Flattened datasets generated by embodiments of the present disclosure may be stored (325) in new or existing database files. In some embodiments, for example, a new dataset generated by flattening an existing hierarchical dataset may be stored in the same database file containing the hierarchical dataset.

In some embodiments, dimensions may be created in ascending value order though neither Path fields nor Parents need necessarily be created in order. In some embodiments, the lexicographical order of the concatenated path can be different from the path value ids tuples order. The Parents dimension may be created in depth-first-search (DFS) order. In some embodiments, the system may create dimensions in multiple chunks that are sorted in memory and then flushed to disk. The chunks may then be merged.

In some embodiments, each value id is looked up only once, but access to a dimension may be semi-random. Child identifier lists may be in ascending order.

The memory stack used by the database system may grow according to the depth of the hierarchy of the dataset. Accordingly, some embodiments may enforce a maximum supported tree depth to keep memory usage bounded.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices. Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A database system comprising:
   a processor; and
   memory coupled to the processor and storing instructions that, when executed by the processor, cause the database system to perform operations comprising:
   retrieving records from a hierarchical dataset electronically stored by the database system in one or more database files;
   generating, based on the records from the hierarchical dataset, an inverted index data structure that maps respective content within the hierarchical dataset to respective locations in the hierarchical dataset; and
   generating a flattened dataset corresponding to the hierarchical dataset using the inverted index data structure, wherein generating the flattened dataset includes iterating the child inverted index and the parent inverted index to generate a single mapping array data structure that identifies child nodes in the hierarchical dataset that are also parent nodes, wherein the mapping array data structure includes a multi-value field and a path field to show which nodes have access to each row of data in the hierarchical dataset.

2. The database system of claim 1, wherein the locations to which content are mapped by the inverted index data structure correspond to integer values, and wherein generating the inverted index data structure includes generating an array of integer values mapping parent-child relationships in the hierarchical dataset.

3. The database system of claim 1, wherein generating the inverted index data structure includes:
   generating a child inverted index that maps each respective child node in the hierarchical dataset to a respective location in the hierarchical dataset associated with the respective child node; and
   generating a parent inverted index that maps each respective parent node in the hierarchical dataset to a respective location in the hierarchical dataset associated with the respective parent node.

4. The database system of claim 3, wherein generating the flattened dataset includes mapping child node identifiers to parent node identifiers based on the mapping array data structure.

5. The database system of claim 4, wherein generating the flattened dataset includes generating, based on the mapping of child node identifiers to parent node identifiers, an adjacency list identifying, for each respective parent node, one or more respective child nodes adjacent to the respective parent node.

6. The database system of claim 5, wherein determining the adjacency list includes:
   generating an array containing a list of child node identifiers; and
   generating an array indexed by parent node identifiers associated with the array containing the list of child node identifiers.

7. The database system of claim 5, wherein generating the flattened dataset includes performing a depth-first traversal of the hierarchical dataset using the adjacency list.

8. The database system of claim 1, wherein the memory further stores instructions for causing the database system to receive, from a user system in communication with the database system, an electronic communication identifying the hierarchical dataset.

9. The database system of claim 1, wherein content mapped by the inverted index data structure includes: a text string, an alphanumeric string, a numeric value, or combinations thereof.

10. The database system of claim 1, wherein the memory further stores instructions for causing the database system to store the new dataset in the one or more database files.

11. The database system of claim 1, wherein generating the flattened dataset is performed within a fixed amount of random access memory (RAM), and wherein data exceeding the fixed amount of RAM is written to a secondary memory storage device in communication with the database system.

12. A tangible, non-transitory computer-readable medium storing instructions that, when executed by a database system, cause the database system to perform operations comprising:
  retrieving records from a hierarchical dataset electronically stored by the database system in one or more database files;
  generating, based on the records from the hierarchical dataset, an inverted index data structure that maps respective content within the hierarchical dataset to respective locations in the hierarchical dataset; and
  generating a flattened dataset corresponding to the hierarchical dataset using the inverted index data structure, wherein generating the flattened dataset includes iterating the child inverted index and the parent inverted index to generate a single mapping array data structure that identifies child nodes in the hierarchical dataset that are also parent nodes, wherein the mapping array data structure includes a multi-value field and a path field to show which nodes have access to each row of data in the hierarchical dataset.

13. The computer-readable medium of claim 12, wherein the locations to which content are mapped by the inverted index data structure correspond to integer values, and wherein generating the inverted index data structure includes generating an array of integer values mapping parent-child relationships in the hierarchical dataset.

14. The computer-readable medium of claim 12, wherein generating the inverted index data structure includes:
  generating a child inverted index that maps each respective child node in the hierarchical data set to a respective location in the hierarchical dataset associated with the respective child node; and
  generating a parent inverted index that maps each respective parent node in the hierarchical data set to a respective location in the hierarchical dataset associated with the respective parent node.

15. The computer-readable medium of claim 14, wherein generating the flattened dataset includes mapping child node identifiers to parent node identifiers based on the mapping array data structure.

16. The computer-readable medium of claim 15, wherein generating the flattened dataset includes determining, based on the mapping of child node identifiers to parent node identifiers, an adjacency list identifying, for each respective parent node, one or more respective child nodes adjacent to the respective parent node.

17. The computer-readable medium of claim 16, wherein generating the flattened dataset includes performing a depth-first traversal of the hierarchical dataset using the adjacency list.

18. A method comprising:
  retrieving, by a database system, records from a hierarchical dataset electronically stored by the database system in one or more database files;
  generating, by the database system based on the records from the hierarchical dataset, an inverted index data structure that maps respective content within the hierarchical dataset to respective locations in the hierarchical dataset; and
  generating, by the database system, a flattened dataset corresponding to the hierarchical dataset using the inverted index data structure, wherein generating the flattened dataset includes iterating the child inverted index and the parent inverted index to generate a single mapping array data structure that identifies child nodes in the hierarchical dataset that are also parent nodes, wherein the mapping array data structure includes a multi-value field and a path field to show which nodes have access to each row of data in the hierarchical dataset.

* * * * *